UNITED STATES PATENT OFFICE.

KRISTIAN BIRKELAND, OF CHRISTIANIA, NORWAY, ASSIGNOR TO NORSK-HYDRO-ELEKTRISK KVAELSTOFAKTIESELSKAB, OF CHRISTIANIA, NORWAY.

PROCESS OF EXTRACTING METALS FROM MINERALS, ROCKS, AND OTHER MATERIALS.

1,071,290.  Specification of Letters Patent.  Patented Aug. 26, 1913.

No Drawing.  Application filed December 31, 1912. Serial No. 739,558.

*To all whom it may concern:*

Be it known that I, KRISTIAN BIRKELAND, a subject of the King of Norway, residing at Christiania, Norway, have invented certain new and useful Improvements in Processes of Extracting Metals from Minerals, Rocks, and other Materials; and I do hereby declare the following to be a full, clear, and exact description of the invention, such as will enable others skilled in the art to which it appertains to make and use the same.

The technical progresses of the last decade have resulted in the production of very large quantities of nitric acid. First, there is, as is well known, the acid obtained by the combustion of air according to various processes, and secondly the acid produced by the oxidation of ammonia according to Ostwald and lately according to the processes based upon the important discoveries of Haber. It has therefore already for a long time been one of the most important modern problems to chemists how to utilize this great quantity of nitric acid. It had already been proposed to use nitric acid for extracting metals from ores. For this purpose however commercial nitric acid will be too expensive. One might seek to recover in some manner or other the nitric acid used, as such or as a nitrate, and to avoid losses of nitric acid by special means; but the special apparatus and plants required for this purpose would render the whole extraction plant too expensive.

According to the present invention the use of nitric acid for the extraction of metals from their ores and other materials is rendered possible by combining the extraction of metal with the production of nitric acid from air, in such a manner, that the dilute nitric acid obtained by absorption of the nitrous gases is used directly for the extraction of the metals, after which the latter are precipitated by means of lime and the solution worked to produce nitrate of lime in a manner which is in itself well known. By this combination the dilute nitric acid, which according to known methods is neutralized directly with lime, is first utilized for carrying out an extraction process, which accordingly is obtained as it were quite without expense. Furthermore, a perfect utilization of the nitric acid remaining in the extraction residues is rendered possible by the said combination without the use of apparatus especially provided for this purpose, as said acid may, by means of the nitrous gases issuing from the air combustion furnaces, be expelled and be further worked together with said gases.

The process may be employed for ores and metalliferous materials of the most different kinds and is eminently adapted for the extraction of poor ores and especially metalliferous materials containing metallic compounds and oxygen. If a plurality of metals are dissolved by the acid, disadvantageous or undesirable constituents may be removed by successive precipitations. Thus for instance arsenic may, by known processes of precipitation, be separated from zinc and a number of valuable metals from each other. Also from the residuum, which is treated with acid, valuable substances, such as molybdenum, may afterward be extracted by means of ammonia.

When using the process for treating a rock containing bismuth and consisting for instance of quartz, muscovite, and feldspar with a content of bismuth of 0.5 to 0.75% (as $Bi_2S_3$) one may suitably work in the manner, described below: After the rock has been crushed and may have been subjected to a washing process, it may be roasted—which is preferably effected by means of hot gases from the air combustion furnaces if the amount of sulfur contained in the ore is too small to produce the necessary heat by its combustion. The crushed ore which may have been roasted is then treated with dilute acid whereby the bismuth is extracted. When the acid has obtained a suitable contenth of bismuth, it is neutralized for instan with lime, limestone, or soda and, it may be, mixed with water for separating off bismuth in the form of basic nitrate of bismuth. The remaining solution may afterward be further treated. To obtain directly a pure bismuth compound one may also work so as to first precipitate with lime and dissolve the precipitate in some nitric acid, whereupon pure basic nitrate of bismuth is separated off by precipitation with water. If precipitating with water only, the remaining acid may be concentrated in an absorption tower. The residues from the extraction with nitric acid may be washed with water, which may then be introduced into an absorption tower, or the residues may be treated with hot furnace gases to remove residual nitric acid from the residues and said gases are then further treated together with the nitrous gases. The acid contained in the residues is hereby completely utilized. The gases obtained by the roasting of the ore before leaching and which contain sulfur dioxid are suitably mixed in a hot state with oxidized nitrous gases from the air combustion furnaces, an excess of said gases being preferably used in order that no nitrogen oxid may be lost. The nitrogen dioxid ($NO_2$) contained in these oxidized gases will oxidize the sulfurous acid into sulfuric acid anhydrid, which is then extracted. Supposing that the air used for the roasting and air combustion operations has been well dried, a compound of sulfurous acid and nitrogen oxid will be formed, which compound may afterward readily be decomposed so that the sulfuric acid and the nitrogen compound may be separated and then extracted. The lower nitrogen oxygen compounds obtained by the oxidation of the sulfurous acid are suitably reoxidized and further worked in the ordinary way. The extraction of the ore with nitric acid may also be effected without a previous roasting of the ore, extracting directly with warm acid. The gases thereby formed are introduced into the absorption towers. For keeping warm the acid employed hot furnace gases may suitably be used. When working in this manner a separation of sulfur and a formation of gaseous compounds of sulfur will take place simultaneously with the dissolution of the metals. The free and bound sulfur thus obtained is utilized in the manner that the gases formed by the reaction are returned to the acid tower, while the sulfur obtained in an elementary condition may be separated from the solution in suitable filtering apparatus. After washing and purifying this sulfur will form a valuable commercial article. The metal salt-solution may then as above described be further worked. Under certain circumstances it may also be of advantage to treat the ore with highly heated steam prior to the extraction, to expel in this manner a larger or smaller portion of the sulfur.

When using the process for treating ores containing zinc and copper, said metals may be separated from each other by dissolving the zinc with dilute, warm (not boiling hot) nitric acid, the copper remaining undissolved.

Instead of completely neutralizing the solution obtained by the extraction, in the manner above described with lime or soda, it may sometimes be of advantage to treat the solution (which for various reasons may contain considerable quantities of free acid, inter alia because the ore will not be dissolved by very dilute acid) with limestone in such manner as to only nearly neutralize it. Thereby the sulfuric acid, which may have been formed in the nitric acid treatment, is precipitated in the form of gypsum, which may be filtered off. The solution which will now contain only nitrate, is then further treated for obtaining the nitrates as such or for precipitating the metals as oxids or basic carbonates using as a precipitating agent lime, magnesia, their carbonates or the like. The solution obtained after repeated filtering may then be worked for the production of nitrate of lime.

From the above description it will be seen that a decided advantage results in treating or lixiviating any kind of ore or metalliferous material with the intermediary products resulting from furnaces of the class mentioned. That is, the furnace gases are conducted directly into the ore and before they have had an opportunity to cool and change their constituents by mutual combination. Nitric acid treatment for ores, even of moderately lean ores, is commercially practicable by using the gases direct from the furnaces, for the nitrifaction of air. The heat of these gases is not wasted, the water used for washing the treated ore being employed for the absorption of further quantities of nitrous gases in treating new quantities of material, and the acid left in the ore is evaporated by means of the hot gases.

Claims:

1. The process of treating ores containing sulfur, which comprises roasting the ore with hot nitrogen oxid gases, withdrawing the gases evolved and mixing them with further quantities of nitrogen oxid gases, absorbing the mixed gases in water to form a weak acid solution, treating the roasted ore with said acid solution, withdrawing the solution and recovering values dissolved from the ore.

2. The process of treating ores containing sulfur, which comprises roasting the ore with hot nitrogen oxid gases, withdrawing the gases evolved and mixing them with further quantities of nitrogen oxid gases, absorbing the mixed gases in water to form a weak acid solution, treating the roasted ore with said acid solution, forcing hot nitrogen oxid gases through the residue to eliminate any nitric acid, absorbing the resulting gas to form weak acid and recovering values dissolved from the ore.

In testimony that I claim the foregoing as my invention, I have signed my name in presence of two subscribing witnesses.

KRISTIAN BIRKELAND.

Witnesses:
 M. E. GUTBORNESEN,
 RUTH LINDSTRÖM.